United States Patent
Zhu et al.

(10) Patent No.: US 12,305,921 B2
(45) Date of Patent: May 20, 2025

(54) ROTARY KILN SEALING SYSTEM AND ROTARY KILN EQUIPMENT

(71) Applicant: HENAN LONGCHENG COAL HIGH EFFICIENCY TECHNOLOGY APPLICATION CO., LTD., Nanyang (CN)

(72) Inventors: Shucheng Zhu, Nanyang (CN); Xibin Wang, Nanyang (CN); Yanwu Lv, Nanyang (CN); Jinfeng Li, Nanyang (CN); Fang Li, Nanyang (CN); Yongxing Wang, Nanyang (CN)

(73) Assignee: HENAN LONGCHENG COAL HIGH EFFICIENCY TECHNOLOGY APPLICATION CO., LTD., Nanyang (CN)

( * ) Notice: Subject to any disclaimer, the term of this patent is extended or adjusted under 35 U.S.C. 154(b) by 597 days.

(21) Appl. No.: 17/619,410

(22) PCT Filed: Aug. 6, 2020

(86) PCT No.: PCT/CN2020/107522
§ 371 (c)(1),
(2) Date: Dec. 15, 2021

(87) PCT Pub. No.: WO2021/196484
PCT Pub. Date: Oct. 7, 2021

(65) Prior Publication Data
US 2022/0381511 A1    Dec. 1, 2022

(30) Foreign Application Priority Data
Apr. 1, 2020 (CN) .......................... 202010253033.2

(51) Int. Cl.
F27B 7/24 (2006.01)
F16J 15/52 (2006.01)
F27D 9/00 (2006.01)

(52) U.S. Cl.
CPC ................. *F27B 7/24* (2013.01); *F16J 15/52* (2013.01); *F27D 9/00* (2013.01); *F27D 2009/0013* (2013.01)

(58) Field of Classification Search
CPC ... F27B 7/24; F27B 7/224; F16J 15/52; F27D 9/00; F27D 2009/0013; F16L 51/025; F16L 51/026; F16L 59/21
See application file for complete search history.

(56) References Cited

U.S. PATENT DOCUMENTS

| | | | | |
|---|---|---|---|---|
| 4,680,009 A | * | 7/1987 | Ernst | C21B 13/08 432/79 |
| 6,419,724 B1 | * | 7/2002 | Monteyne | F27B 7/2083 75/476 |
| 2019/0137181 A1 | * | 5/2019 | Zhdanok | F27B 7/30 |

FOREIGN PATENT DOCUMENTS

| | | | | |
|---|---|---|---|---|
| CN | 104019316 A | * | 9/2014 | F16L 51/025 |
| CN | 106523833 A | | 3/2017 | |

(Continued)

OTHER PUBLICATIONS

European Communication unde4r Rule 71(3) for Application No. 20929587.2, dated Feb. 10, 2023.

(Continued)

*Primary Examiner* — Edelmira Bosques
*Assistant Examiner* — Michael James Giordano
(74) *Attorney, Agent, or Firm* — MARSHALL, GERSTEIN & BORUN LLP

(57) ABSTRACT

A rotary kiln sealing system and rotary kiln equipment are provided. The rotary kiln sealing system includes a first housing and a second housing. The second housing is (Continued)

annularly disposed outside the first housing in space, and a first gap is left between the first housing and the second housing. An elastic compensation joint is disposed outside the second housing.

13 Claims, 4 Drawing Sheets

(56) References Cited

FOREIGN PATENT DOCUMENTS

| | | | |
|---|---|---|---|
| CN | 206235149 U | 6/2017 | |
| CN | 207562852 U | 7/2018 | |
| CN | 207688630 U | 8/2018 | |
| CN | 110762315 A | 2/2020 | |
| CN | 110762317 A | 2/2020 | |
| CN | 110762320 A | 2/2020 | |
| CN | 111322413 A | 6/2020 | |
| EP | 2110631 A1 | 10/2009 | |
| JP | 2003021461 A | 1/2003 | |
| JP | 2005195198 A | 7/2005 | |

OTHER PUBLICATIONS

Decision of Grant from Indian Application No. 202127058530, dated Mar. 15, 2024.
Decision to Grant from Japanese Application No. 2021-568552, dated Oct. 19, 2023.
Decision to Grant from Korean Application No. 10-2022-7001499, dated Feb. 1, 2024.
Notice of Reasons for Refusal for Japanese Patent Application No. 2021-568552, dated Dec. 20, 2022.
Office Action for Korean Application No. 10-2022-7001499, dated Jan. 14, 2022.
Notice of Reason for Refusal for Japanese Patent Application No. 2021-568552, dated Jun. 30, 2023.
European Communication pursuant to Article 94 (3) EPC for Application No. 20929587.2, dated Sep. 28, 2022.
Office Action for Indian Application No. 202127058530, dated Nov. 23, 2022.
European Search Report for Application No. EP 20929587, dated Aug. 26, 2022.
International Search Report with Translation for International Application No. PCT/CN2020/107522, mailed Dec. 30, 2020.
Written Opinion for International Application No. PCT/CN2020/107522, mailed Dec. 30, 2020.

* cited by examiner

ROTARY KILN SEALING SYSTEM AND ROTARY KILN EQUIPMENT

CROSS-REFERENCE TO RELATED APPLICATION

This present application is the US national phase of International Patent Application No. PCT/CN2020/107522 filed Aug. 6, 2020, which claims priority to Chinese Patent Application No. 202010253033.2, entitled "Rotary kiln sealing system and Rotary kiln equipment", filed with Chinese patent office on Apr. 1, 2020. The priority application, CN 202010253033.2, is hereby incorporated by reference in its entirety.

TECHNICAL FIELD

The present disclosure relates to the field of sealing technologies, and particularly to a rotary kiln sealing system and rotary kiln equipment.

BACKGROUND ART

Currently, when started, a rotary kiln usually has an axis with a worst linearity, and a greatest bounce, and with a long-time operation of the rotary kiln, the linearity gradually tends to a straight line, and the bounce of the rotary kiln may get smaller; however, the bounce always exists, a rotary-kiln material-discharging cover swings up and down and left and right with rotation of the rotary kiln, a material-discharging port swings with the up-and-down and left-and-right swing of the material-discharging cover; for low-temperature pyrolysis of coal or oil shale or biomass, coal gas has toxicity and major safety problems, such that a strict sealing effect is required, and not only a strict sealing effect is required between the material-discharging cover and a rotary kiln tail, but also a material-discharging sealing mechanism between the material-discharging port of the material-discharging cover and a receiving bin port is required to meet a sealing requirement while swinging up and down and left and right.

SUMMARY

The present disclosure provides a rotary kiln sealing system and rotary kiln equipment, which enable a material-discharging sealing mechanism to meet a sealing requirement while swinging up and down and left and right.

Embodiments of the present disclosure may be implemented as follows.

Embodiments of the present disclosure provide a rotary kiln sealing system, including a rotary-kiln-material-discharging-cover material-discharging sealing system and a rotary-kiln-material-discharging-cover outlet-gas sealing system, wherein the rotary-kiln-material-discharging-cover material-discharging sealing system includes a material-discharging port, a material-discharging sealing mechanism and a receiving bin, and the material-discharging port, the material-discharging sealing mechanism and the receiving bin are sequentially communicated; the rotary-kiln-material-discharging-cover outlet-gas sealing system includes a gas outlet, a coal-gas sealing mechanism and a coal gas pipeline, and the gas outlet, the coal-gas sealing mechanism and the coal gas pipeline are sequentially communicated; the rotary kiln sealing system includes a first housing and a second housing, the second housing surrounds the first housing spatially, a first gap is reserved between the first housing and the second housing, a first flange is fixedly connected to one end of the first housing, a second flange is fixedly connected to the second housing in a direction away from the first flange, the other end of the first housing away from the first flange is a free end located in the second flange, a second gap is reserved between one end of the second housing close to the first flange and the first flange, an elastic expansion joint (elastic compensation joint) is provided outside the second housing, two ends of the elastic expansion joint are hermetically connected with the first flange and the second flange respectively, and the elastic expansion joint, the first flange and the second flange are combined to form a sealed cavity, such that the first flange and the second flange may have stretchable spacing therebetween;

a first annular plate is fixedly connected to an end face of the first housing close to the second flange, a cavity structure is formed by the first housing, the first flange and the first annular plate, a second annular plate is fixedly connected to an end face of the second housing close to the first flange, and a cavity structure is formed by the second housing, the second flange and the second annular plate.

When a rotary-kiln material-discharging cover is displaced up and down and left and right with rotation of a rotary kiln, the rotary kiln sealing system is connected, such that displacement of the rotary kiln sealing system may be compensated, and meanwhile, a strict sealing effect of a material-discharging system may be guaranteed.

Specifically, when the rotary-kiln material-discharging cover is displaced up and down and left and right with the rotation of the rotary kiln, by connecting the rotary kiln sealing system according to the embodiment of the present disclosure, the up-and-down and left-and-right displacement may be buffered by the elastic expansion joint provided between the first flange and the second flange, and in order to prevent collision between the first housing and the second housing, the first gap is reserved between the first housing and the second housing, so as to guarantee a sufficient displacement space. Furthermore, in order to prevent contact collision between the end face of the second housing and the first flange, the second gap is provided between one end of the second housing close to the first flange and the first flange.

The providing of the two-layer housing (the first housing and the second housing) and the elastic expansion joint enables that when the rotary-kiln sealing mechanism rotates around the rotary kiln along with the material-discharging cover, the displacement is not limited, and meanwhile, a strict sealing requirement of the sealing mechanism is met.

The rotary kiln sealing system includes the rotary-kiln-material-discharging-cover material-discharging sealing system and the rotary-kiln-material-discharging-cover outlet-gas sealing system. In the above, the rotary-kiln-material-discharging-cover material-discharging sealing system includes the material-discharging port, the material-discharging sealing mechanism and the receiving bin, and the material-discharging port, the material-discharging sealing mechanism and the receiving bin are sequentially communicated; the rotary-kiln-material-discharging-cover outlet-gas sealing system includes the gas outlet, the coal-gas sealing mechanism and the coal gas pipeline, and the gas outlet, the coal-gas sealing mechanism and the coal gas pipeline are sequentially communicated.

In an optional embodiment of the present disclosure, water cooling cavities are provided in the first housing and the second housing, a peripheral wall of the first housing is provided with a first water inlet and a first water outlet, a peripheral wall of the second housing is provided with a second water inlet and a second water outlet, and the first water inlet, the first water outlet, the second water inlet and the second water outlet run through the elastic expansion joint, and the first water inlet, the first water outlet, the second water inlet and the second water outlet are hermetically connected with the elastic expansion joint.

Adaptive adjustment may be performed on positions of the first water inlet, the first water outlet, the second water inlet and the second water outlet the peripheral wall of the first housing or the second housing according to actual requirements.

Chambers for accommodating heat exchange media are provided in the first housing and the second housing. By the two double-layer-structure housings (the first housing and the second housing), radiant heat of pyrolyzed coal which the elastic expansion joint may contact and receive is almost absorbed by the two double-layer-structure housings, thus a material of the external elastic expansion joint may be better selected.

Furthermore, the elastic expansion joint receives less radiant heat inside the rotary kiln sealing system due to a cavity next to an exterior of the rotary kiln sealing system, and the material of the elastic expansion joint is relatively easy to select.

The elastic expansion joint is an elastic rubber product or a metal corrugated expansion joint.

In an optional embodiment of the present disclosure, when the above-mentioned elastic expansion joint is a metal corrugated expansion joint, each of the first water inlet, the first water outlet, the second water inlet and the second water outlet is formed of three connecting pipes, the three connecting pipes include a first metal hard pipe, a first hose and a second metal hard pipe which are sequentially communicated, the first metal hard pipes of the first water inlet and the first water outlet are both connected with the first housing, the first metal hard pipes of the second water inlet and the second water outlet are both connected with the second housing, and the second metal hard pipes of the first water inlet, the first water outlet, the second water inlet and the second water outlet are all connected with the elastic expansion joint.

In an optional embodiment of the present disclosure, the above-mentioned metal corrugated expansion joint is a metal expansion joint, is made of stainless steel, and has a thickness of 1-2 mm.

The first hose has a function of compensating for a position change of the sealing mechanism of the rotary kiln.

In an optional embodiment of the present disclosure, when the above-mentioned elastic expansion joint is an elastic rubber product, each of the first water inlet, the first water outlet, the second water inlet and the second water outlet is formed of two connecting pipes, the two connecting pipes include a third metal hard pipe and a second hose in communication with each other, the third metal hard pipes in the first water inlet and the first water outlet are both connected with the first housing, the third metal hard pipes in the second water inlet and the second water outlet are both connected with the second housing, and the second hoses in the first water inlet, the first water outlet, the second water inlet and the second water outlet are all connected with the elastic expansion joint.

In other embodiments, a first insulating layer is provided in the first housing, and a second insulating layer is provided in the second housing. The radiant heat of pyrolyzed coal which the elastic expansion joint may contact and/or receive is almost insulated by the two insulating structures.

In one embodiment, gas hole(s) is/are formed in peripheries of the first housing and the second housing. The number of the gas hole is at least one, thus ensuring that gas in the insulating structure in the housing may enter and exit from the housing under the condition of expansion with heat and contraction with cold in the housing, so as to avoid deformation of the housing caused by expansion with heat and contraction with cold due to the gas in the airtight housing.

In one embodiment, at least one ventilation gap is reserved at a joint of the first housing and the first flange (i.e. at least a gap for allowing gas to pass therethrough is provided where the first housing is connected with the first flange), and at least one ventilation gap is reserved at a joint of the second housing and the second flange.

In one embodiment, at least one ventilation gap is reserved at a joint of the first housing and the first annular plate; and at least one ventilation gap is reserved at a joint of the second housing and the second annular plate.

In other embodiments, a first insulating layer is provided in the first housing, a housing is provided in the second housing, a second water inlet and a second water outlet are provided in a peripheral wall of the second housing, the second water inlet and the second water outlet run through the elastic expansion joint, and the second water inlet and the second water outlet are both hermetically connected with the elastic expansion joint.

The second housing may be provided with a water cooling cavity, and the radiant heat in the housing may be taken away by circulating water to meet an heat insulation requirement.

In an optional embodiment of the present disclosure, the first flange and the second flange above are annular, an inner circle of the second flange has a radius D, an inner circle of the first flange has a radius B, a sidewall of the first flange has a thickness C, the first gap has spacing A, and $D > A+B+C$.

If the radius D of the inner circle of the second flange is less than $A+B+C$, the first housing and the second housing may collide with each other, thus affecting normal use of the rotary-kiln sealing mechanism.

A value of A (of the first gap) is a maximum value of the up-and-down and left-and-right bounce of the rotary-kiln material-discharging cover along with the rotation of a rotary kiln tail. A too small value of A may also cause collision damage to the first housing and the second housing.

In an optional embodiment of the present disclosure, the above-mentioned second annular plate has a thickness F, the second gap has spacing E, and $E > A+F$.

In an optional embodiment of the present disclosure, the second housing, the second flange and the second annular plate are welded to form a cavity structure.

In an optional embodiment of the present disclosure, a first annular plate is fixedly connected to an end face of the above-mentioned first housing close to the second flange, and a cavity structure is formed by the first housing, the first flange, and the first annular plate.

Embodiments of the present disclosure further provide rotary kiln equipment, including a rotary kiln tail, a rotary-kiln material-discharging cover and a rotary kiln sealing system. The rotary kiln tail is connected with the rotary-kiln material-discharging cover, and the rotary-kiln-material-discharging-cover material-discharging sealing system and the rotary-kiln-material-discharging-cover outlet-gas sealing system are both mounted on the rotary-kiln material-discharging cover. When the material-discharging sealing system is displaced up and down and left and right along with rotation of a rotary kiln, by connecting the rotary kiln sealing system according to the embodiments of the present disclosure, the up-and-down and left-and-right displacement may be buffered by the elastic expansion joint provided between the first flange and the second flange.

The gas outlet of the rotary-kiln-material-discharging-cover outlet-gas sealing system is formed above the material-discharging cover.

In other embodiments, the gas outlet of the rotary-kiln-material-discharging-cover outlet-gas sealing system is provided in an end face of the material-discharging cover.

Embodiments of the present disclosure further provide rotary kiln equipment, the rotary-kiln-material-discharging-cover material-discharging sealing system includes a material-discharging port, a material-discharging sealing mechanism and a receiving bin port sequentially communicated, the rotary-kiln-material-discharging-cover outlet-gas sealing system includes a gas outlet and a coal gas pipeline, the gas outlet has one end in communication with the receiving bin port and the other end in communication with the coal gas pipeline, and the gas outlet is configured to guide gas in the receiving bin port to flow into the coal gas pipeline;

the material-discharging sealing mechanism includes a first housing and a second housing, the second housing surrounds the first housing spatially, a first gap is reserved between the first housing and the second housing, a first flange is fixedly connected to one end of the first housing, a second flange is fixedly connected to the second housing in a direction away from the first flange, the other end of the first housing away from the first flange is a free end located in the second flange, a second gap is reserved between one end of the second housing close to the first flange and the first flange, an elastic expansion joint is provided outside the second housing, two ends of the elastic expansion joint are hermetically connected with the first flange and the second flange respectively, and the elastic expansion joint, the first flange and the second flange are combined to form a sealed cavity, such that the first flange and the second flange may have stretchable spacing therebetween; and a first annular plate is fixedly connected to an end face of the first housing close to the second flange, a cavity structure is formed by the first housing, the first flange and the first annular plate, a second annular plate is fixedly connected to an end face of the second housing close to the first flange, and a cavity structure is formed by the second housing, the second flange and the second annular plate.

That is, after coal gas and a solid material together pass through a rotary-kiln material-discharging system, the coal gas is separated in the receiving bin.

Compared with a prior art, the embodiments of the present disclosure have the following beneficial effects, for example.

The embodiments of the present disclosure provide the rotary kiln sealing system and the rotary kiln equipment, an external strict sealing effect of the rotary kiln sealing system is achieved by arranging the first housing, the second housing and the elastic expansion joint, and sufficient movement adjustment ranges are reserved up, down, left and right by the double-housing structure, such that when mounted at the material-discharging cover, the rotary kiln sealing system is not limited with the rotation of the rotary kiln. The elastic expansion joint realizes compensation for the swing displacement. Furthermore, the double-housing structure may absorb the radiant heat of pyrolyzed coal, such that the material of the external sealed elastic expansion joint is easier to select and has a longer service life. The structure according to the embodiment of the present disclosure also avoids shortened service life of the external elastic expansion joint due to contact with the radiant heat. Therefore, the rotary kiln equipment according to the embodiment of the present disclosure may meet the sealing requirement while swinging up and down and left and right.

BRIEF DESCRIPTION OF DRAWINGS

To describe the technical solutions in the embodiments of the present disclosure more clearly, the following briefly describes the accompanying drawings required in the embodiments. It should be understood that the following accompanying drawings show merely some embodiments of the present disclosure and therefore should not be considered as limiting the scope, and a person of ordinary skill in the art may still derive other related drawings from these accompanying drawings without creative efforts.

Figure 1:
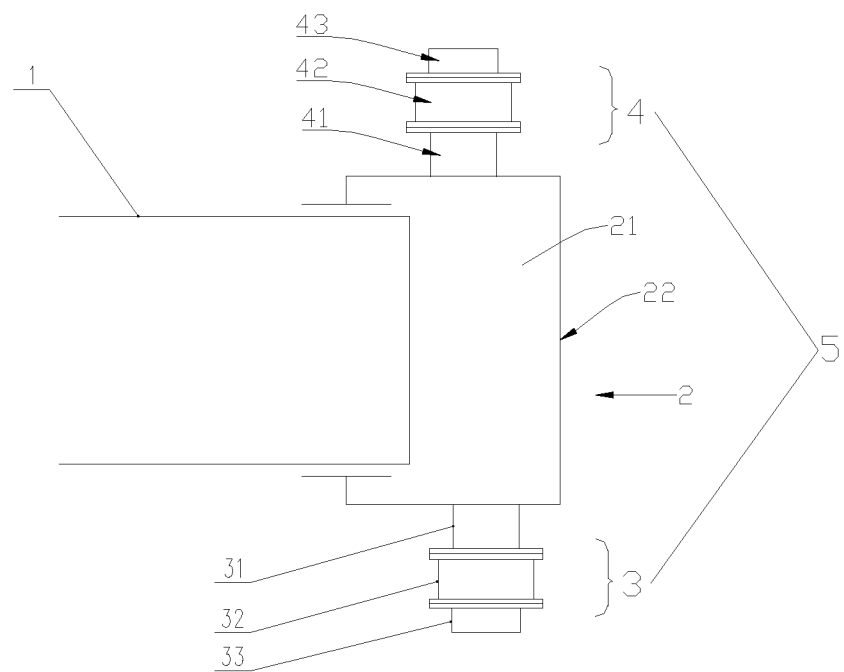
FIG. 1 is a general schematic diagram of first rotary kiln equipment according to an embodiment of the present disclosure.

Reference numerals: 1—rotary kiln tail; 2—rotary-kiln material-discharging cover; 3—rotary-kiln-material-discharging-cover material-discharging sealing system; 4—rotary-kiln-material-discharging-cover outlet-gas sealing system; 5—rotary kiln sealing system; 21—transverse cylinder; 22—end face; 31—material-discharging port; 32—material-discharging sealing mechanism; 33—receiving bin port; 34—material-discharging bin; 3211—first flange; 3221—second flange; 3212—first housing; 32121—overflow pipe; 3213—first annular plate; 3214—first water inlet; 3215—first water outlet; 3222—second housing; 3223—second annular plate; 3224—second water inlet; 3225—second water outlet; 323—elastic expansion joint; 41—gas outlet; 42—coal-gas sealing mechanism; 43—coal gas pipeline.

DETAILED DESCRIPTION

To make the objectives, technical solutions and advantages of the embodiments of the present disclosure clearer, the technical solutions in the embodiments of the present disclosure are clearly and completely described with reference to the accompanying drawings in the embodiments of the present disclosure, and apparently, the described embodiments are not all but a part of the embodiments of the present disclosure. Generally, the components of the embodiments of the present disclosure described and illustrated in the drawings herein may be arranged and designed in a variety of different configurations.

Accordingly, the following detailed description of the embodiments of the present disclosure provided in the drawings is not intended to limit the scope of protection of the present disclosure, but only represents selected embodiments of the present disclosure. All other embodiments obtained by a person of ordinary skill in the art based on the embodiments of the present disclosure without creative efforts shall fall within the protection scope of the present disclosure.

It should be noted that similar reference signs and letters denote similar items in the following drawings. Therefore, once a certain item is defined in one figure, it does not need to be further defined and explained in the subsequent figures.

In descriptions of the present disclosure, it should be noted that directions or positional relationships indicated by terms "center", "upper", "lower", "left", "right", "vertical", "horizontal", "inner", "outer", "clockwise", "anticlockwise", etc. are based on orientations or positional relationships shown in the accompanying drawings, or orientations or positional relationships of conventional placement of the product according to the present invention in use, and they are used only for describing the present disclosure and for description simplicity, but do not indicate or imply that an indicated device or element must have a specific orientation or be constructed and operated in a specific orientation. Therefore, it cannot be understood as a limitation on the present disclosure. In addition, the terms such as "first", "second", "third", or the like, are only used for distinguishing descriptions and are not intended to indicate or imply importance in relativity.

In addition, the terms of "horizontal", "vertical", and "overhung" and so on do not represent that the means is absolutely horizontal or overhung but it can be slightly tilted. For example, "horizontal" only means that the direction is more horizontal than "vertical" and can be slightly tilted, instead that this structure has to be horizontal completely.

In the description of the present disclosure, it still should be noted that unless specified or limited otherwise, the terms "provided", "mounted", "connected", and "coupled" and the like should be understood broadly, for example, it may be fixed connections, detachable connections, or integral connections; may also be mechanical connections or electrical connections; may also be direct connections or indirect connections via intermediate medium; or may also be inner communications of two elements. The above terms can be understood by those skilled in the art according to specific situations.

Figure 2:
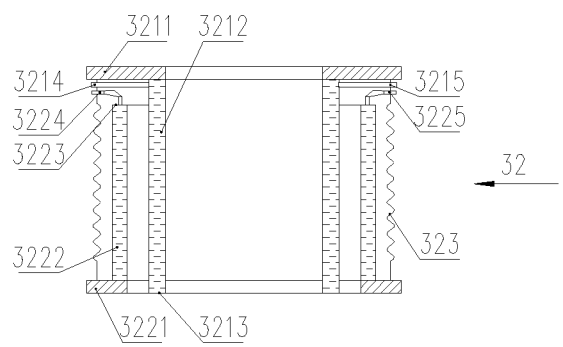
FIG. 2 is an internal schematic diagram of a first material-discharging sealing mechanism in the embodiment of the present disclosure.

Referring to FIGS. 1 and 2, an embodiment provides rotary kiln equipment, including a rotary kiln tail 1, a rotary-kiln material-discharging cover 2, and a rotary kiln sealing system 5. The rotary kiln sealing system 5 includes a rotary-kiln-material-discharging-cover outlet-gas sealing system 4 and a rotary-kiln-material-discharging-cover material-discharging sealing system 3. The rotary-kiln-material-discharging-cover outlet-gas sealing system 4 is configured to discharge coal gas, and the rotary-kiln-material-discharging-cover material-discharging sealing system 3 is used for a solid material.

In the present embodiment, the rotary-kiln-material-discharging-cover outlet-gas sealing system 4 is provided at a top of the rotary-kiln material-discharging cover 2, and the rotary-kiln-material-discharging-cover material-discharging sealing system 3 is provided at a bottom of the rotary-kiln material-discharging cover 2.

In the above, the rotary-kiln material-discharging cover 2 is composed of a transverse cylinder 21 and an end face 22, the transverse cylinder 21 and the end face 22 are fixedly welded to each other, the rotary-kiln material-discharging cover 2 is provided on a periphery of the rotary kiln tail 1, and in use, the rotary-kiln material-discharging cover 2 may bounce up and down and left and right along with rotation of the rotary kiln tail 1, the bounce has a maximum amplitude A, and A is less than 50 mm.

The rotary-kiln-material-discharging-cover material-discharging sealing system 3 includes a material-discharging port 31, a material-discharging sealing mechanism 32 and a receiving bin port 33, one end of the material-discharging port 31 is hermetically connected with a bottom end of the transverse cylinder 21, an inner cavity of the material-discharging port 31 is in communication with an inner cavity of the transverse cylinder 21, and the other end of the material-discharging port 31 is connected with the receiving bin port 33 by the material-discharging sealing mechanism 32. The material-discharging port 31, the material-discharging sealing mechanism 32 and the receiving bin port 33 are connected with each other by flanges.

In use, the material may be delivered from the material-discharging port 31 into the material-discharging sealing mechanism 32 and discharged through the receiving bin port 33.

Referring to FIG. 2, in the present embodiment, the material-discharging sealing mechanism 32 includes a first housing 3212 and a second housing 3222, the second housing 3222 surrounds the first housing 3212 spatially, an elastic expansion joint 323 is located outside the second housing 3222, a first flange 3211 is fixedly connected to one end of the first housing 3212, the other end of the first housing 3212 away from the first flange 3211 is a free end located in a second flange 3221, and the free end may be displaced up and down in a length direction of the first housing 3212, and may also be displaced left and right in a first gap. The second flange 3221 is fixedly connected to the second housing 3222 in a direction away from the first flange 3211, and two ends of the elastic expansion joint 323 are hermetically connected with the first flange 3211 and the second flange 3221 respectively, such that the first flange 3211 and the second flange 3221 have freely stretchable spacing therebetween; the first gap is reserved between the first housing 3212 and the second housing 3222, and a second gap is reserved between the first flange 3211 and one end of the second housing 3222 close to the first flange 3211.

The first gap is set to have spacing A in the present embodiment. A maximum value of the first gap is a maximum value of the spacing between an outer wall of the first housing 3212 and an inner wall of the second housing 3222.

An inner circle of the second flange 3221 has a greater diameter than an inner circle of the first flange 3211, a radius of the inner circle of the first flange 3211 has a value B, the first housing 3212 is provided along a lower end face of the inner circle of the first flange 3211 and extends downwards to an end face of the second flange 3221, and a first annular plate 3213 is hermetically welded at a lower end face of the first housing 3212, wherein the first housing 3212, the first flange 3211 and the first annular plate 3213 form a welded sealed structure, a side wall of the first housing 3212 has a thickness C, and a radius D of the inner circle of the second flange 3221 is greater than A+B+C.

The second housing 3222 is provided along the inner circle of the second flange 3221, and extends upwards to having a spacing E (the second gap) to the lower end face of the first flange, a second annular plate 3223 is hermetically welded to an upper end face of the second housing 3222, wherein the second annular plate 3223 has a thickness F, and E>A+F. The second housing 3222, the second flange 3221, and the second annular plate 3223 form a welded sealed structure.

A first water inlet 3214 and a first water outlet 3215 are provided in a peripheral wall of the first housing 3212, the first water inlet 3214 is in communication with the first water outlet 3215, a second water inlet 3224 and a second water outlet 3225 are provided in a peripheral wall of the second housing 3222, and the second water inlet 3224 is in communication with the second water outlet 3225.

The first water inlet 3214, the first water outlet 3215, the second water inlet 3224 and the second water outlet 3225 all run through the elastic expansion joint 323.

Between the first flange 3211 and the second flange 3221, the elastic expansion joint 323 is provided at a periphery of the second housing 3222, and an upper end and a lower end of the elastic expansion joint 323 are hermetically connected with the first flange 3211 and the second flange 3221 respectively. A sealed cavity is formed by combination of the elastic expansion joint 323, the first flange 3211 and the second flange 3221.

In the present embodiment, the elastic expansion joint 323 is a metal corrugated expansion joint. Furthermore, in other embodiments, the elastic expansion joint 323 may also be a rubber product, and it is within the scope of protection of the present disclosure as long as the product satisfies a function of elastic compensation.

In the present embodiment, referring to FIG. 2, the first water inlet 3214 and the first water outlet 3215 are both provided in a top of the first housing 3212, and the second water inlet 3224 and the second water outlet 3225 are both provided in a top of the second housing 3222. In use, the material in the sealing mechanism is cooled by a heat exchange medium (water) to reduce a quantity of heat radiation released outwards.

In the present embodiment, each of the first water inlet 3214, the first water outlet 3215, the second water inlet 3224 and the second water outlet 3225 is formed by three connecting pipes. The three connecting pipes include a first metal hard pipe, a first hose and a second metal hard pipe sequentially communicated, the first metal hard pipes of the first water inlet 3214 and the first water outlet 3215 are connected with the first housing 3212, the first metal hard pipes of the second water inlet 3224 and the second water outlet 3225 are connected with the second housing 3222, and the second metal hard pipes of the first water inlet 3214, the first water outlet 3215, the second water inlet 3224 and the second water outlet 3225 are all connected with the elastic expansion joint 323. Referring to FIG. 1, the rotary-kiln-material-discharging-cover outlet-gas sealing system 4 includes a gas outlet 41, a coal-gas sealing mechanism 42 and a coal gas pipeline 43 sequentially communicated, and an inner cavity of the gas outlet 41 is in communication with a top of the rotary-kiln material-discharging cover 2; and in use, the coal gas is led out from the top of the rotary-kiln material-discharging cover 2, passes through the coal-gas sealing mechanism 42 and is led out from the coal gas pipeline 43. The gas pipeline 43 may be externally connected with a coal-gas collecting device or purifying device.

Figure 3:
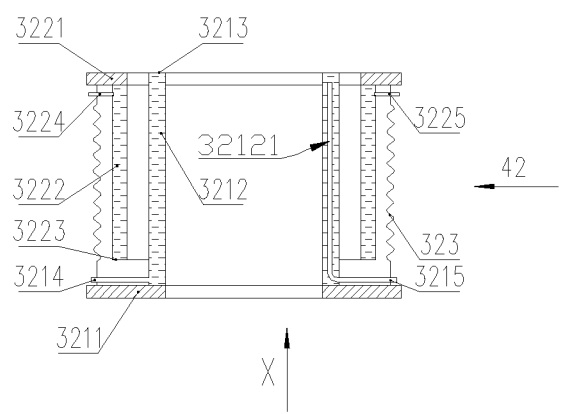
FIG. 3 is an internal schematic diagram of a first coal-gas sealing mechanism in the embodiment of the present disclosure.

In the present embodiment, a structure of the coal-gas sealing mechanism 42 is as shown in FIG. 3, the coal-gas sealing mechanism 42 is connected to the gas outlet 41 in FIG. 1 by a flange in a direction indicated by the arrow X in FIG. 3, and a first flange 3211 of the coal-gas sealing mechanism 42 is connected with the gas outlet 41 in FIG. 1.

In FIG. 3, the coal-gas sealing mechanism 42 includes a first housing 3212 and a second housing 3222, the second housing 3222 surrounds the first housing 3212 spatially, and an elastic expansion joint 323 is located outside the second housing 3222.

The first flange 3211 is fixedly connected to a bottom end of the first housing 3212, a second flange 3221 is fixedly connected to a top end of the second housing 3222, and two ends of the elastic expansion joint 323 are hermetically connected with the first flange 3211 and the second flange 3221 respectively, such that the first flange 3211 and the second flange 3221 have freely stretchable spacing therebetween; a first gap is reserved between the first housing 3212 and the second housing 3222, and a second gap is reserved between the first flange 3211 and one end of the second housing 3222 close to the first flange 3211.

Referring to FIG. 3, a first water inlet 3214 is provided in a lower portion of the first housing 3212, and water enters the first housing 3212 through the first water inlet 3214. An overflow pipe 32121 is embedded in the first housing 3212, the overflow pipe 32121 is L-shaped, and one end of the overflow pipe 32121 extends to a top of a chamber of the first housing 3212, and the other end of the overflow pipe 32121 is in communication with a first water outlet 3215 located outside the first housing 3212.

In use, cooling water enters the chamber of the first housing 3212 from the first water inlet 3214 below the first housing 3212 and a level of the cooling water gradually rises, wherein when the level of the cooling water rises to the height of an inlet of the overflow pipe 32121, the water flows into the overflow pipe 32121 and out of the first water outlet 3215 below the first housing 3212, thus achieving heat exchange to enable heat insulation by cooling.

A water cooling cavity is also provided in the second housing 3222 of the coal-gas sealing mechanism 42, a second water inlet 3224 and a second water outlet 3225 are provided at two opposite sides of the second housing 3222 respectively, and in the present embodiment, the second water inlet 3224 and the second water outlet 3225 of the coal-gas sealing mechanism 42 are both provided at an upper portion of the second housing 3222. In use, water enters the second housing from the second water inlet 3224 in the left side of the second housing 3222 in FIG. 3, and when a level of water exceeds the height of the second water outlet 3225, the water overflows out from the second housing 3222.

In the present embodiment, radiant heat of the material and the coal gas is absorbed by the double-water-cooling-housing structure in FIGS. 2 and 3.

Figure 4:
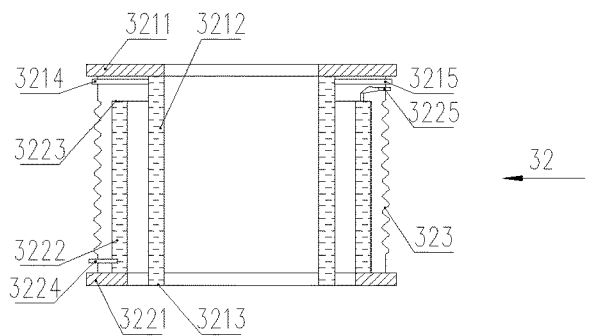
FIG. 4 is an internal schematic diagram of a second material-discharging sealing mechanism in the embodiment of the present disclosure.
Figure 5:
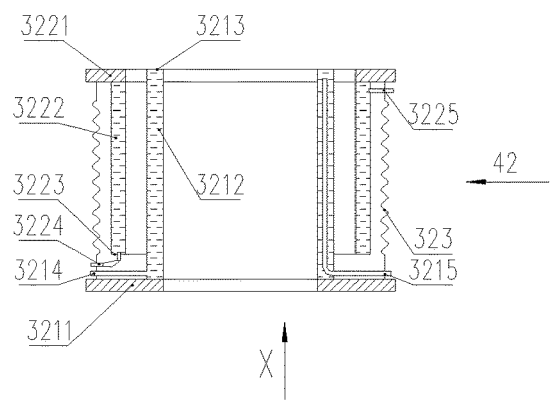
FIG. 5 is an internal schematic diagram of a second coal-gas sealing mechanism in the embodiment of the present disclosure.

In some other embodiments, referring to FIGS. 4 and 5, the elastic expansion joints 323 of the coal-gas sealing mechanism 42 and the material-discharging sealing mechanism 32 are both elastic rubber products, while in FIGS. 2 and 3, the elastic expansion joints 323 of the coal-gas sealing mechanism 42 and the material-discharging sealing mechanism 32 are both metal corrugated expansion joints.

In some other embodiments, referring to FIGS. 4 and 5, the material-discharging sealing mechanism 32 shown in FIG. 4 is different from the material-discharging sealing mechanism 32 shown in FIG. 2 in that the second water inlet 3224 of the material-discharging sealing mechanism 32 is provided in a bottom of the second housing 3222, and the second water outlet 3225 of the material-discharging sealing mechanism 32 is provided in the top of the second housing 3222; while in FIG. 2, the second water inlet 3224 and the second water outlet 3225 of the material-discharging sealing mechanism 32 are both provided in the top of the second housing 3222.

In addition, in FIG. 4, each of the first water inlet 3214, the first water outlet 3215, the second water inlet 3224, and the second water outlet 3225 of the material-discharging sealing mechanism 32 is formed by two connecting pipes. The two connecting pipes include a third metal hard pipe and a second hose in communication with each other, the third metal hard pipes of the first water inlet 3214 and the first water outlet 3215 are connected with the first housing 3212, the third metal hard pipes of the second water inlet 3224 and the second water outlet 3225 are connected with the second housing 3222, and the second hoses of the first water inlet 3214, the first water outlet 3215, the second water inlet 3224 and the second water outlet 3225 all run through the elastic expansion joint 323 and are hermetically connected with the elastic expansion joint 323. The second hose has a function of compensating for a position change of a material-discharging mechanism.

The coal-gas sealing mechanism 42 shown in FIG. 5 is different from the coal-gas sealing mechanism 42 shown in FIG. 3 in that the second water inlet 3224 of the second housing 3222 of the coal-gas sealing mechanism 42 is provided in the bottom of the second housing 3222.

In FIG. 5, during a coal-gas heat exchange of the coal-gas sealing mechanism 42, cold water is introduced to enter the second water inlet 3224 in the bottom of the second housing 3222, and when a level of water in the second housing 3222 rises to the height of the second water outlet 3225, water overflows out along the second water outlet 3225. In the first housing, the cooling water enters the chamber of the first housing 3212 from the first water inlet 3214 below the first housing 3212, and flows into the overflow pipe 32121 as a level of water rises to the height of the overflow pipe 32121, and flows out from the first water outlet 3215 below the first housing 3212, thus achieving heat exchange to enable heat insulation by cooling.

Figure 6:
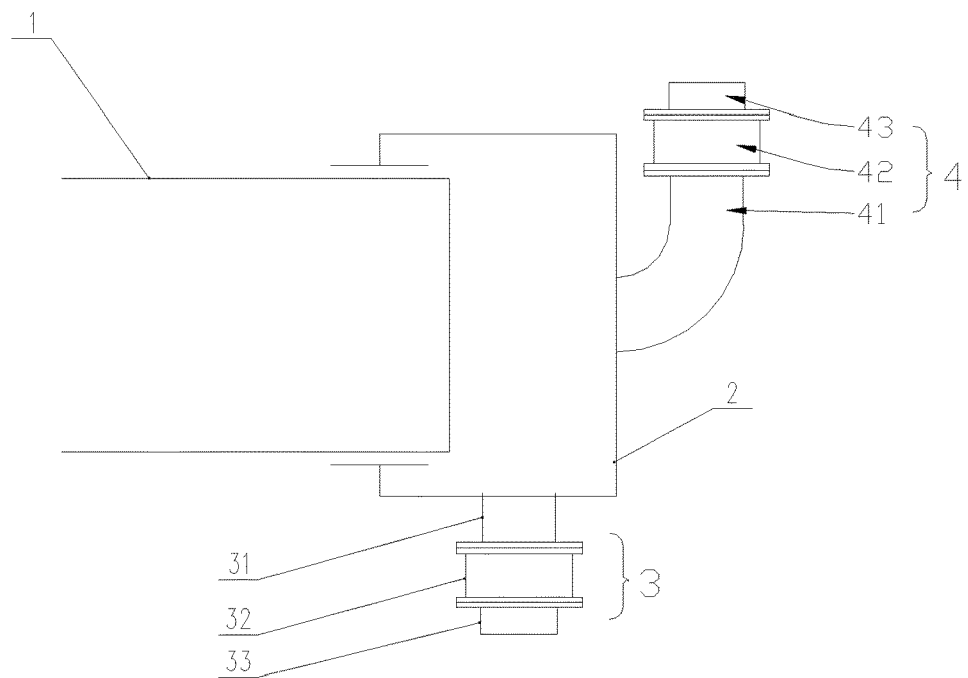
FIG. 6 is a general schematic diagram of second rotary kiln equipment according to the embodiment of the present disclosure.

In some other embodiments, referring to FIG. 6, the rotary kiln equipment shown in FIG. 6 is different from the rotary kiln equipment shown in FIG. 1 in that the rotary-kiln-material-discharging-cover outlet-gas sealing system 4 shown in FIG. 6 is located on an end face of the rotary-kiln material-discharging cover 2, and the rotary-kiln-material-discharging-cover material-discharging sealing system 3 is located at a bottom end of the rotary-kiln material-discharging cover 2, while the rotary-kiln-material-discharging-cover outlet-gas sealing system 4 in FIG. 1 is located at a top end of the rotary-kiln material-discharging cover 2.

Figure 7:
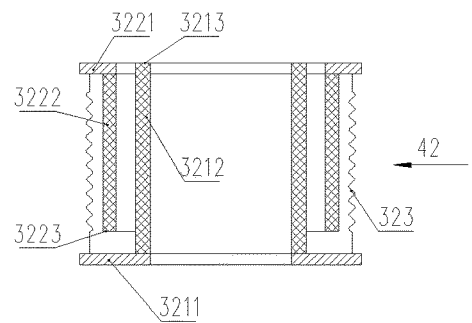
FIG. 7 is an internal schematic diagram of a third coal-gas sealing mechanism in the embodiment of the present disclosure.

In some other embodiments, referring to FIG. 7, the coal-gas sealing mechanism 42 in FIG. 7 is different from the coal-gas sealing mechanism 42 in FIG. 3 in that the double housings do not include the first water inlet 3214, the first water outlet 3215, the second water inlet 3224, and the second water outlet 3225. The double housings are each provided therein with an insulating layer. Specifically, a first insulating layer is provided in the first housing 3212, and a second insulating layer is provided in the second housing 3222.

In some other embodiments, at least one ventilation gap may be reserved at a welded joint between the first flange 3211 and the first annular plate 3213, the second housing 3222, the second flange 3221 and the second annular plate 3223 form a welded connection structure, and at least one ventilation gap is reserved.

In the present embodiment, two gas holes are reserved in an outer housing of the first housing 3212 of the coal-gas sealing mechanism 42, and two gas holes are reserved in an outer housing of the second housing 3222.

Figure 8:
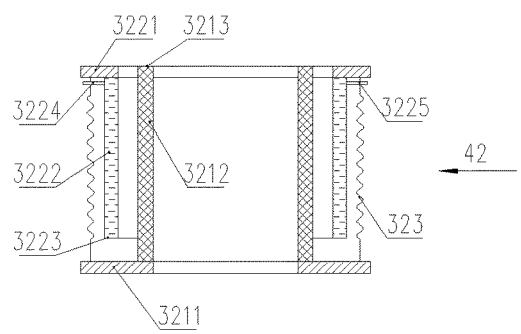
FIG. 8 is an internal schematic diagram of a fourth coal-gas sealing mechanism in the embodiment of the present disclosure.

In FIG. 8, a first insulating layer is provided in a first housing 3212 of the coal-gas sealing mechanism 42, and the structure of the first housing 3212 is the same as that of the first housing 3212 in FIG. 7. In FIG. 8, a water cooling cavity is provided in the second housing 3222, and a second water inlet 3224 and a second water outlet 3225 are provided in two sides of the second housing 3222 respectively.

In FIG. 8, the second water inlet 3224 and the second water outlet 3225 are both provided in the top of the second housing 3222. In use, water enters the second housing from the second water inlet 3224, and when the level of water in the water cooling cavity exceeds the height of the second water outlet 3225, circulating water overflows out from the second water outlet 3225.

Figure 9:
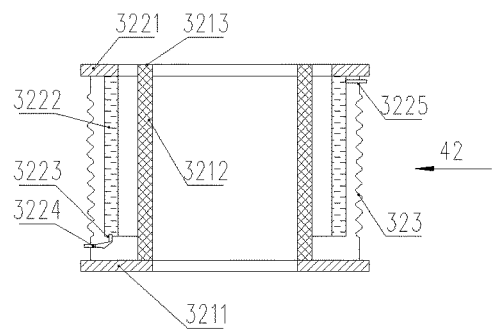
FIG. 9 is an internal schematic diagram of a fifth coal-gas sealing mechanism in the embodiment of the present disclosure.

In some other embodiments, the coal-gas sealing mechanism 42 shown in FIG. 9 is different from the coal-gas sealing mechanism 42 in FIG. 8 in that in FIG. 8, the second water inlet 3224 of the second housing 3222 is provided below the second housing 3222.

Figure 10:
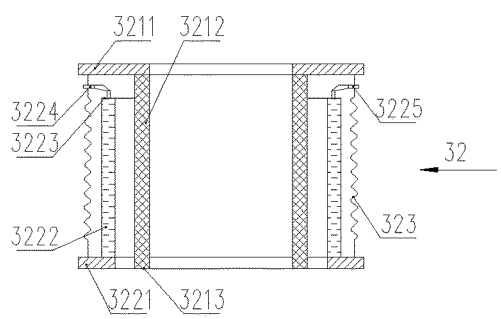
FIG. 10 is an internal schematic diagram of a third material-discharging sealing mechanism in the embodiment of the present disclosure.

In some other embodiments, as shown in FIG. 10, the material-discharging sealing mechanism 32 in FIG. 10 includes a rotary kiln tail 1, a rotary-kiln material-discharging cover 2 and a rotary kiln sealing system 5. The rotary kiln sealing system 5 includes a rotary-kiln-material-discharging-cover outlet-gas sealing system 4 and a rotary-kiln-material-discharging-cover material-discharging sealing system 3.

The rotary-kiln-material-discharging-cover material-discharging sealing system 3 includes a material-discharging port 31, a material-discharging sealing mechanism 32 and a receiving bin port 33. The structure of the material-discharging sealing mechanism 32 is shown in FIG. 10. A first housing 3212 is internally provided with a first insulating layer and does not include a water cooling cavity, a first water inlet 3214 and a first water outlet 3215.

A ventilation gap is reserved at a joint between an outer layer of the first housing 3212 and a first annular plate 3213. The rotary-kiln-material-discharging-cover outlet-gas sealing system 4 includes a gas outlet 41, a coal-gas sealing mechanism 42 and a coal gas pipeline 43 sequentially communicated.

The structure of the coal-gas sealing mechanism 42 is shown in FIG. 3 of the first embodiment, the coal-gas sealing mechanism 42 is connected to the gas outlet 41 in FIG. 1 by a flange in the direction indicated by the arrow X in FIG. 3, and a first flange 3211 of the coal-gas sealing mechanism 42 is connected with the gas outlet 41 in FIG. 1.

Figure 11:
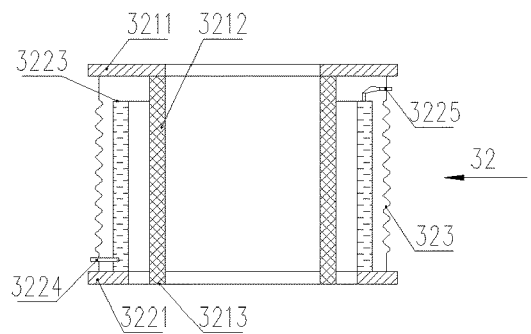
FIG. 11 is an internal schematic diagram of a fourth material-discharging sealing mechanism in the embodiment of the present disclosure.
Figure 12:
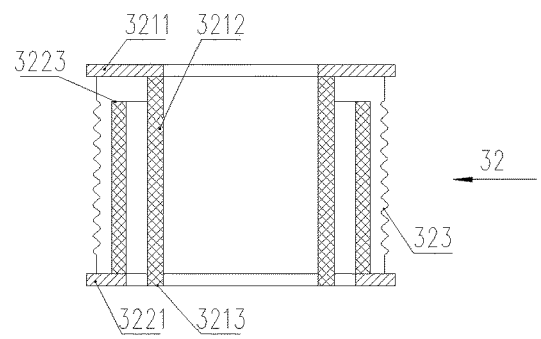
FIG. 12 is an internal schematic diagram of a fifth material-discharging sealing mechanism in the embodiment of the present disclosure.

In some other embodiments, a second water inlet 3224 outside a second housing 3222 of the material-discharging sealing mechanism 32 shown in FIG. 11 is provided at a lower portion of the second housing 3222, and a second water outlet 3225 is provided at an upper portion of the second housing 3222. In some other embodiments, the structure of the material-discharging sealing mechanism 32 in FIG. 12 is different from the structure of the material-discharging sealing mechanism in FIG. 10 in that the second housing 3222 is filled with a second insulating layer, and one gas hole (not shown) is provided outside the second housing 3222.

Figure 13:
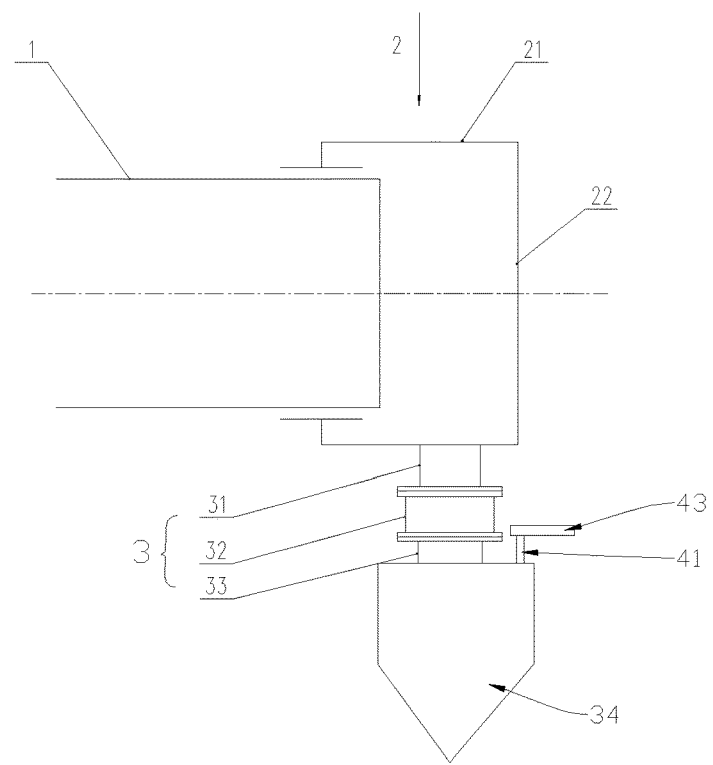
FIG. 13 is a general schematic diagram of third rotary kiln equipment according to the embodiment of the present disclosure.

In some other embodiments, FIG. 13 is different from FIG. 1 in that the rotary-kiln-material-discharging-cover outlet-gas sealing system 4 in FIG. 1 is provided at the top of the rotary-kiln material-discharging cover 2, and the rotary-kiln-material-discharging-cover material-discharging sealing system 3 is provided at the bottom of the rotary-kiln material-discharging cover 2; the rotary-kiln-material-discharging-cover outlet-gas sealing system 4 and the rotary-kiln-material-discharging-cover material-discharging sealing system 3 in FIG. 13 share the material-discharging sealing mechanism 32. A material-discharging bin 34 is fixedly connected to a bottom of a receiving bin port 33, and a gas outlet 41 is formed beside the material-discharging bin 34, and the gas outlet 41 is in communication with a coal gas pipeline 43.

In use, smoke gas and a material enter the material-discharging bin 34 from the material-discharging sealing mechanism 32 at the same time, and the gas is discharged after separated from the gas outlet 41 at the top of the material-discharging bin 34.

The above are only specific embodiments of the present disclosure and not intended to limit the present disclosure, and various modifications and changes may be made to the present disclosure by those skilled in the art. Any modifications, equivalent replacements, or improvements made within the spirit and principle of the present disclosure shall be included in the protection scope of the present disclosure.

INDUSTRIAL APPLICABILITY

In summary, the present disclosure provides a rotary kiln sealing system and rotary kiln equipment, which may meet a sealing requirement while swinging in different directions.

What is claimed is:

1. A rotary kiln sealing system, comprising a rotary-kiln-material-discharging-cover material-discharging sealing system and a rotary-kiln-material-discharging-cover outlet-gas sealing system, wherein the rotary-kiln-material-discharging-cover material-discharging sealing system comprises a material-discharging port, a material-discharging sealing mechanism and a receiving bin, and the material-discharging port, the material-discharging sealing mechanism and the receiving bin are sequentially communicated; the rotary-kiln-material-discharging-cover outlet-gas sealing system comprises a gas outlet, a coal-gas sealing mechanism and a coal gas pipeline, and the gas outlet, the coal-gas sealing mechanism and the coal gas pipeline are sequentially communicated; each of the material-discharging sealing mechanism and the coal-gas sealing mechanism comprises a first housing and a second housing, wherein the second housing surrounds the first housing spatially, a first gap is reserved between the first housing and the second housing, a first flange is fixedly connected to one end of the first housing, a second flange is fixedly connected to the second housing in a direction away from the first flange, the other end of the first housing away from the first flange is a free end located in the second flange, a second gap is reserved between the first flange and one end of the second housing close to the first flange, an elastic expansion joint is provided outside the second housing, two ends of the elastic expansion joint are hermetically connected with the first flange and the second flange respectively, and the elastic expansion joint, the first flange and the second flange are combined to define a sealed cavity, such that the first flange and the second flange have a stretchable spacing therebetween; and a first annular plate is fixedly connected to an end face of the first housing close to the second flange, a cavity structure is formed by the first housing, the first flange and the first annular plate, a second annular plate is fixedly connected to an end face of the second housing close to the first flange, and a cavity structure is formed by the second housing, the second flange and the second annular plate;

wherein the first flange and the second flange are annular, an inner circle of the second flange has a radius D, an inner circle of the first flange has a radius B, a sidewall of the first flange has a thickness C, the first gap has a spacing A, and D>A+B+C.

2. The rotary kiln sealing system according to claim 1, further comprising a first water inlet, a first water outlet, a second water inlet and a second water outlet, wherein each of the first housing and the second housing is provided with a water-cooling sealed cavity, the first water inlet and the first water outlet are provided in a peripheral wall of the first housing, the first water inlet and the first water outlet are both in communication with the water-cooling sealed cavity of the first housing, the second water inlet and the second water outlet are provided in a periphery of the second housing, the second water inlet and the second water outlet are both in communication with the water-cooling sealed cavity of the second housing, the first water inlet, the first water outlet, the second water inlet and the second water outlet run through the elastic expansion joint, and the first water inlet, the first water outlet, the second water inlet and the second water outlet are all hermetically connected with the elastic expansion joint.

3. The rotary kiln sealing system according to claim 2, wherein the elastic expansion joint is an elastic rubber product or a metal corrugated expansion joint.

4. The rotary kiln sealing system according to claim 3, wherein when the elastic expansion joint is the metal corrugated expansion joint, each of the first water inlet, the first water outlet, the second water inlet and the second water outlet is formed by three connecting pipes, and the three connecting pipes comprise a first metal hard pipe, a first hose and a second metal hard pipe sequentially communicated, wherein the first metal hard pipes of the first water inlet and the first water outlet are both connected with the first housing, the first metal hard pipes of the second water inlet and the second water outlet are both connected with the second housing, and the second metal hard pipes of the first water inlet, the first water outlet, the second water inlet and the second water outlet are all connected with the elastic expansion joint.

5. The rotary kiln sealing system according to claim 3, wherein when the elastic expansion joint is the elastic rubber product, each of the first water inlet, the first water outlet, the second water inlet and the second water outlet is formed by two connecting pipes, and the two connecting pipes comprise a third metal hard pipe and a second hose in communication with each other, wherein the third metal hard pipes of the first water inlet and the first water outlet are both connected with the first housing, the third metal hard pipes of the second water inlet and the second water outlet are both connected with the second housing, and the second hoses of the first water inlet, the first water outlet, the second water inlet and the second water outlet are all connected with the elastic expansion joint.

6. The rotary kiln sealing system according to claim 1, wherein a first insulating layer is provided in the first housing, and a second insulating layer is provided in the second housing.

7. The rotary kiln sealing system according to claim 1, wherein a first insulating layer is provided in the first housing, a water cooling cavity is provided in the second housing, the rotary kiln sealing system further comprises a second water inlet and a second water outlet, the second water inlet and the second water outlet are provided in a periphery of the second housing, the second water inlet and the second water outlet are both in communication with the water cooling cavity, the second water inlet and the second water outlet run through the elastic expansion joint, and the second water inlet and the second water outlet are both hermetically connected with the elastic expansion joint.

8. The rotary kiln sealing system according to claim 1, wherein the second annular plate has a thickness F, the second gap has a spacing E, and E>A+F.

9. The rotary kiln sealing system according to claim 2, wherein the first water inlet and the first water outlet are both provided at a lower portion of the first housing, the rotary kiln sealing system further comprises an overflow pipe, the overflow pipe is provided in the first housing, and the overflow pipe has one end extending to a top of the first housing and the other end in communication with the first water outlet.

10. A rotary kiln equipment, comprising a rotary kiln tail, a rotary-kiln material-discharging cover and the rotary kiln sealing system according to claim 1, wherein the rotary kiln tail is connected with the rotary-kiln material-discharging cover, and the rotary-kiln-material-discharging-cover material-discharging sealing system and the rotary-kiln-material-discharging-cover outlet-gas sealing system are both mounted on the rotary-kiln material-discharging cover.

11. The rotary kiln equipment according to claim 10, wherein the gas outlet of the rotary-kiln-material-discharging-cover outlet-gas sealing system is provided at an end face of the material-discharging cover.

12. A rotary kiln equipment, comprising a rotary-kiln-material-discharging-cover outlet-gas sealing system and a rotary-kiln-material-discharging-cover material-discharging sealing system, wherein the rotary-kiln-material-discharging-cover material-discharging sealing system comprises a material-discharging port, a material-discharging sealing mechanism and a receiving bin port sequentially communicated, the rotary-kiln-material-discharging-cover outlet-gas sealing system comprises a gas outlet and a coal gas pipeline, the gas outlet has one end in communication with the receiving bin port and the other end in communication with the coal gas pipeline, and the gas outlet is configured to guide gas in the receiving bin port to flow into the coal gas pipeline;

the material-discharging sealing mechanism comprises a first housing and a second housing, the second housing surrounds the first housing spatially, a first gap is reserved between the first housing and the second housing, a first flange is fixedly connected to one end of the first housing, a second flange is fixedly connected to the second housing in a direction away from the first flange, the other end of the first housing away from the first flange is a free end located in the second flange, a second gap is reserved between the first flange and one end of the second housing close to the first flange, an elastic expansion joint is provided outside the second housing, two ends of the elastic expansion joint are hermetically connected with the first flange and the second flange respectively, and the elastic expansion joint, the first flange and the second flange are combined to define a sealed cavity, such that the first flange and the second flange have a stretchable spacing therebetween;

a first annular plate is fixedly connected to an end face of the first housing close to the second flange, a cavity structure is formed by the first housing, the first flange and the first annular plate, a second annular plate is fixedly connected to an end face of the second housing close to the first flange, and a cavity structure is formed by the second housing, the second flange and the second annular plate; and wherein the first flange and the second flange are annular, an inner circle of the second flange has a radius D, an inner circle of the first flange has a radius B, a sidewall of the first flange has a thickness C, the first gap has a spacing A, and D>A+B+C.

13. The rotary kiln sealing system according to claim 2, wherein a first insulating layer is provided in the first housing, a water cooling cavity is provided in the second housing, the rotary kiln sealing system further comprises a second water inlet and a second water outlet, the second water inlet and the second water outlet are provided in a periphery of the second housing, the second water inlet and the second water outlet are both in communication with the water cooling cavity, the second water inlet and the second water outlet run through the elastic expansion joint, and the second water inlet and the second water outlet are both hermetically connected with the elastic expansion joint.

* * * * *